United States Patent
Wang et al.

(10) Patent No.: US 9,814,081 B2
(45) Date of Patent: Nov. 7, 2017

(54) METHODS FOR PROCESSING EMERGENCY CALL AND COMMUNICATIONS APPARATUSES UTILIZING THE SAME

(71) Applicant: MediaTek Inc., Hsin-Chu (TW)

(72) Inventors: Chien-Yi Wang, Taipei (TW);
Wei-Chiang Peng, Zhongli (TW);
Kuan-Ming Lin, Hsinchu (TW);
Yu-Syuan Jheng, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 42 days.

(21) Appl. No.: 13/957,683

(22) Filed: Aug. 2, 2013

(65) Prior Publication Data
US 2015/0038108 A1    Feb. 5, 2015

(51) Int. Cl.
*H04W 76/00* (2009.01)
*H04W 4/22* (2009.01)
(Continued)

(52) U.S. Cl.
CPC ....... *H04W 76/007* (2013.01); *H04L 65/1016* (2013.01); *H04L 65/1046* (2013.01);
(Continued)

(58) Field of Classification Search
CPC .. H04W 4/22; H04W 76/007; H04L 65/1006; H04L 65/1016; H04M 2242/04; H04M 7/006
See application file for complete search history.

(56) References Cited

U.S. PATENT DOCUMENTS 6,625,457 B1 * 9/2003 Raith ................... 455/456.1
7,623,840 B2   11/2009 Kauppinen et al.
(Continued)

FOREIGN PATENT DOCUMENTS

CN    1505908 A    11/2003
CN    101031135 A    9/2007
(Continued)

OTHER PUBLICATIONS

"PDF Context and EPS bearer context for emergency call;" Renesas Mobile Europe; 3GPP TSG CT WG1 Meeting #76; Feb. 2012; pp. 1-6.
(Continued)

*Primary Examiner* — Nathan Mitchell
*Assistant Examiner* — Ernest Tacsik
(74) *Attorney, Agent, or Firm* — McClure, Qualey & Rodack, LLP

(57) ABSTRACT

A communications apparatus includes a baseband signal processing device, an RF signal processing device, a memory device, and a processor. The processor transmits a normal call-establishment signal with a remote identifier to a network to originate a normal call in response to a first call-origination request with the remote identifier, receives an indication message indicating that the normal call is routed as an emergency call from the network, records the remote identifier in the memory device, and when receiving a second call-origination request with the remote identifier, transmits an emergency call-establishment signal with the remote identifier to the network to originate an emergency call in response to the second call-origination request.

18 Claims, 6 Drawing Sheets

(51) Int. Cl.
*H04W 4/02* (2009.01)
*H04M 3/42* (2006.01)
*H04M 3/51* (2006.01)
*H04L 29/06* (2006.01)

(52) U.S. Cl.
CPC .... *H04L 65/1069* (2013.01); *H04M 3/42102* (2013.01); *H04M 3/42306* (2013.01); *H04M 3/5116* (2013.01); *H04W 4/02* (2013.01); *H04W 4/22* (2013.01); *H04M 3/42348* (2013.01); *H04M 2207/185* (2013.01)

(56) References Cited

U.S. PATENT DOCUMENTS

| | | | |
|---|---|---|---|
| 2005/0233727 A1* | 10/2005 | Poikselka | H04W 4/02 455/404.2 |
| 2009/0149200 A1* | 6/2009 | Jayasinghe et al. | 455/456.3 |
| 2009/0280770 A1* | 11/2009 | Mahendran | 455/404.1 |
| 2009/0296688 A1 | 12/2009 | Bakker et al. | |
| 2010/0014508 A1 | 1/2010 | Yang | |
| 2010/0056101 A1* | 3/2010 | Poikselka et al. | 455/404.2 |
| 2011/0038372 A1* | 2/2011 | Wijayanathan et al. | 370/389 |

FOREIGN PATENT DOCUMENTS

| | | |
|---|---|---|
| CN | 101282578 | 10/2008 |
| JP | 2002112344 A | 4/2002 |
| JP | A 2004-511923 | 4/2004 |
| JP | 2005525030 A | 8/2005 |
| JP | 2011523266 A | 8/2011 |
| JP | 2011524673 A | 9/2011 |
| JP | 2012249197 A | 12/2012 |
| WO | WO 01/41458 A2 | 6/2001 |
| WO | WO 03/009627 | 1/2003 |
| WO | 03094563 A1 | 11/2003 |
| WO | WO 03/094563 | 11/2003 |
| WO | 2009137617 A1 | 11/2009 |

OTHER PUBLICATIONS

"Discussion on detecting that the UE has attempted a non UE detectable emergency call;" 3GPP TSG CT WG1 Meeting #55bis; Oct. 2008; pp. 1-4.

"Stage 1 CRs on Non Voice Emergency Services (NOVES);" 3GPP TSG SA Plenary Meeting #52; Jun. 2011; pp. 1-7.

* cited by examiner

METHODS FOR PROCESSING EMERGENCY CALL AND COMMUNICATIONS APPARATUSES UTILIZING THE SAME

BACKGROUND OF THE INVENTION

1. Field of the Invention

The invention relates to methods for processing an emergency call in the IP Multimedia Subsystem (IMS), and more particularly to methods for processing a non-detected emergency call in the IMS.

2. Description of the Related Art

The IP Multimedia Subsystem (IMS) is the technology defined by the Third Generation Partnership Project (3GPP) to provide IP Multimedia services over mobile communications networks. IP Multimedia services provide a dynamic combination of voice, video, messaging, data, etc. within the same session.

The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

Users of user terminals, for example, may need to make calls in emergency situations. A wireless communications network may identify emergency calls and may route emergency calls to public safety communications systems that may be associated with the wireless communications network.

Users may need to make emergency calls when they are either in a "home" communications network or when the user may be "roaming" and may be proximate to another, "local" or "visited" communications network. However, while the cell phone user is roaming, an emergency call sent from the user's cell phone may not be routed to a public safety system that is associated with the local (or visited) communications network. Thus, the appropriate emergency responders who are located in or near the user's current location may not receive notification in a timely manner.

Therefore, an enhancement method for handling the emergency call in the IP Multimedia Subsystem (IMS) is provided.

BRIEF SUMMARY OF THE INVENTION

A communications apparatus and methods for processing emergency calls are provided. An exemplary embodiment of a communications apparatus comprises a baseband signal processing device, a radio frequency (RF) signal processing device, a memory device, and a processor. The processor transmits a normal call-establishment signal with a remote identifier to a network to originate a normal call in response to a first call-origination request with the remote identifier, receives an indication message indicating that the normal call is routed as an emergency call from the network, records the remote identifier in the memory device, and when receiving a second call-origination request with the remote identifier, transmits an emergency call-establishment signal with the remote identifier to the network to originate an emergency call in response to the second call-origination request.

An exemplary embodiment of a method for processing an emergency call comprises: transmitting a normal call-establishment signal with a remote identifier to a network to originate a normal call in response to a first call-origination request with the remote identifier by an user equipment; receiving an indication message indicating that the normal call is routed as an emergency call from the network by the user equipment; recording the remote identifier and location information of the user equipment in a memory device by the user equipment; and when receiving a second call-origination request with the remote identifier, transmitting an emergency call-establishment signal with the remote identifier to the network to originate an emergency call in response to the second call-origination request by the user equipment.

Another exemplary embodiment of a method for processing an emergency call comprises: transmitting a normal call-establishment signal with a remote identifier to a network to originate a normal call in response to a first call origination request with the remote identifier by an user equipment; receiving an indication message indicating that the normal call is routed as an emergency call from the network by the user equipment; recording the remote identifier and location information of the user equipment in a memory device by the user equipment; transmitting an emergency call-establishment signal with the remote identifier to the network to originate an emergency call in response to a second call-origination request with the remote identifier by the user equipment; determining whether at least one of a plurality of predefined changes in a location of the user equipment has occurred; and deleting the record of the remote identifier by the user equipment when at least one of the predefined changes in the location of the user equipment is determined to have occurred.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims."

Figure 1:
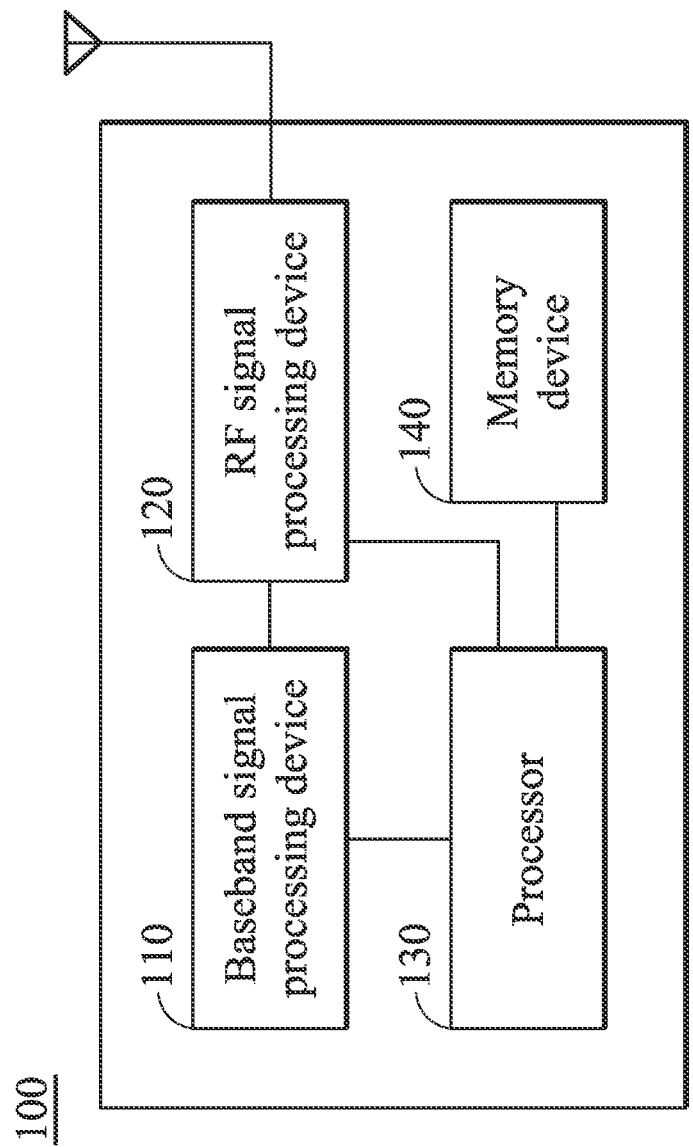
FIG. 1 shows a block diagram of a communications apparatus according to an embodiment of the invention.

FIG. 1 shows a block diagram of a communications apparatus according to an embodiment of the invention. The communications apparatus 100 may be a notebook, a cellular phone, a portable gaming device, a portable multimedia player, a Global Positioning System (GPS), a receiver, a personal digital assistant, a tablet computer, or another such device. The communications apparatus 100 may comprise at least a baseband signal processing device 110, a radio frequency (RF) signal processing device 120, a processor 130, a memory device 140, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 1.

The RF signal processing device 120 may receive RF signals via the antenna and process the received RF signals to convert the received RF signals to baseband signals to be processed by the baseband signal processing device 110, or receive baseband signals from the baseband signal processing device 110 and convert the received baseband signals to RF signals to be transmitted to a peer communications apparatus. The RF signal processing device 120 may comprise a plurality of hardware elements to perform radio frequency conversion. For example, the RF signal processing device 120 may comprise a power amplifier, a mixer, or others.

The baseband signal processing device 110 may further process the baseband signals. The baseband signal processing device 110 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 130 may control the operations of the baseband signal processing device 110 and the RF signal processing device 120. According to an embodiment of the invention, the processor 130 may also be arranged to execute the program codes of the software module(s) of the corresponding baseband signal processing device and/or the RF signal processing device. The program codes accompanied with specific data in a data structure may also be referred to as a processor logic unit or a stack instance when being executed. Therefore, the processor may be regarded as comprising a plurality of processor logic units, each for executing one or more specific functions or tasks of the corresponding software module(s). The memory device 140 may store the software and firmware program codes, system data, user data, etc. of the communications apparatus 100.

According to an embodiment of the invention, the RF signal processing device 120 and the baseband signal processing device 110 may be collectively regarded as a radio module capable of communicating with a wireless network to provide wireless communications services in compliance with a predetermined Radio Access Technology (RAT). Note that, in some embodiments of the invention, the communications apparatus 100 may further be extended to comprise more than one antenna and/or more than one radio module, and the invention should not be limited to what is shown in FIG. 1.

In addition, in some embodiments of the invention, the processor may be configured inside of the baseband signal processing device 110, or the communications apparatus 100 may comprise another processor configured inside of the baseband signal processing device 110. Thus the invention should not be limited to the architecture as shown in FIG. 1.

Figure 2:
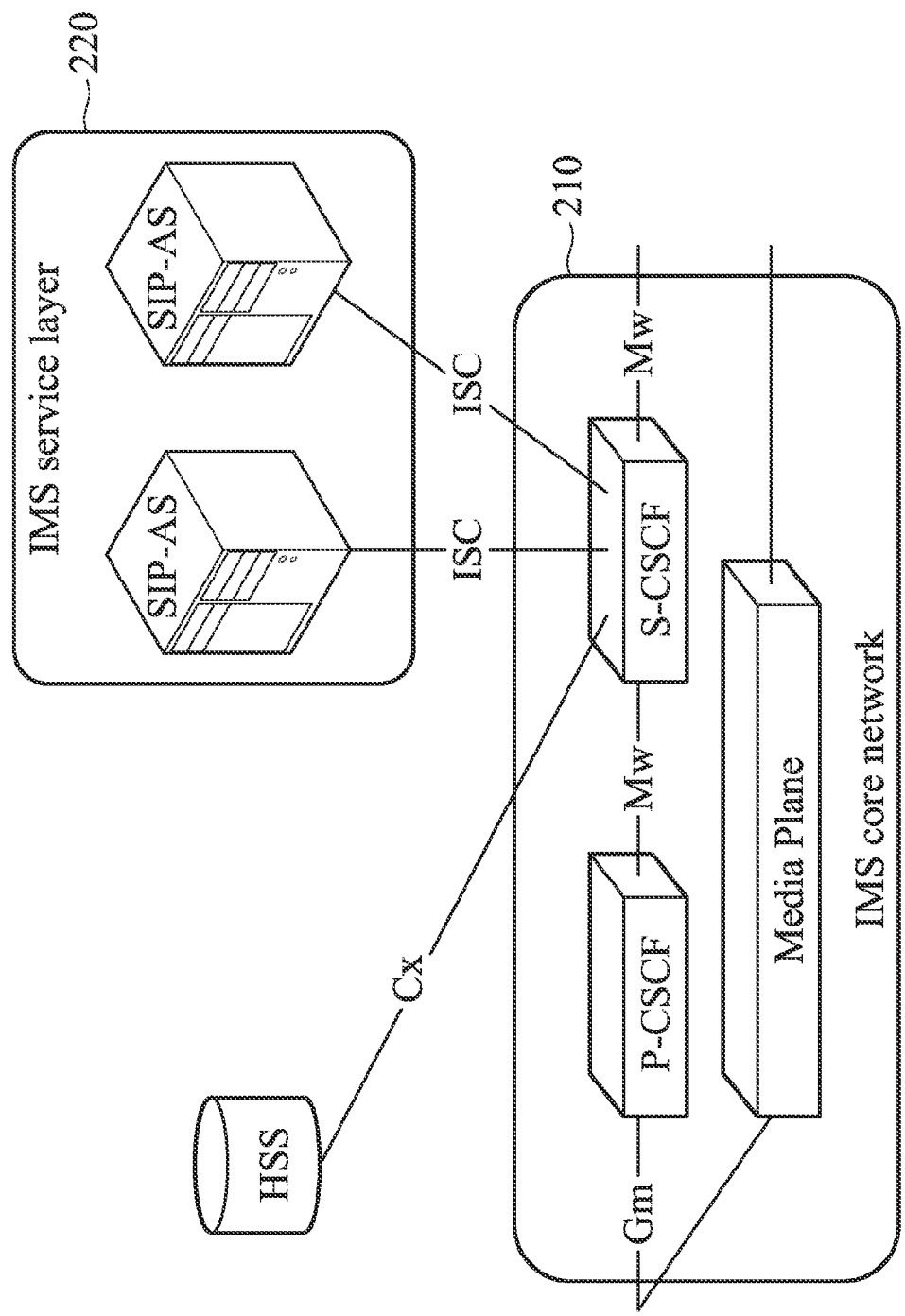
FIG. 2 shows a schematic architecture of an IMS for handling a normal call according to an embodiment of the invention.

FIG. 2 shows a schematic architecture of an IP Multimedia Subsystem (IMS) for handling a normal call according to an embodiment of the invention. The IMS core network 210 includes a Proxy Call/Session Control Function (P-CSCF) and Serving CSCF (S-CSCF) network nodes and a media plane. The IMS service layer 220 includes one or more SIP application servers (SIP-AS). The P-CSCF is a first point of contact within the IMS for an SIP terminal. The SIP terminal may be, for example, user equipment or a communications apparatus as shown in FIG. 1. The S-CSCF provides services to the user to which the user is subscribed. An IP access network may be established between user equipment (UE) and the IMS core network. The Home Subscriber Server (HSS) provides subscriber data to the S-CSCF.

The UE may communicate with the P-CSCF via a Gm interface. The P-CSCF may communicate with the S-CSCF via an Mw interface. The S-CSCF may communicate with a Public Safety Answering Point (PSAP) (not shown) via an Mw interface. The SIP-AS may communicate with the S-CSCF via an ISC interface. The HSS may communicate with the S-CSCF via a Cx interface.

Figure 3:
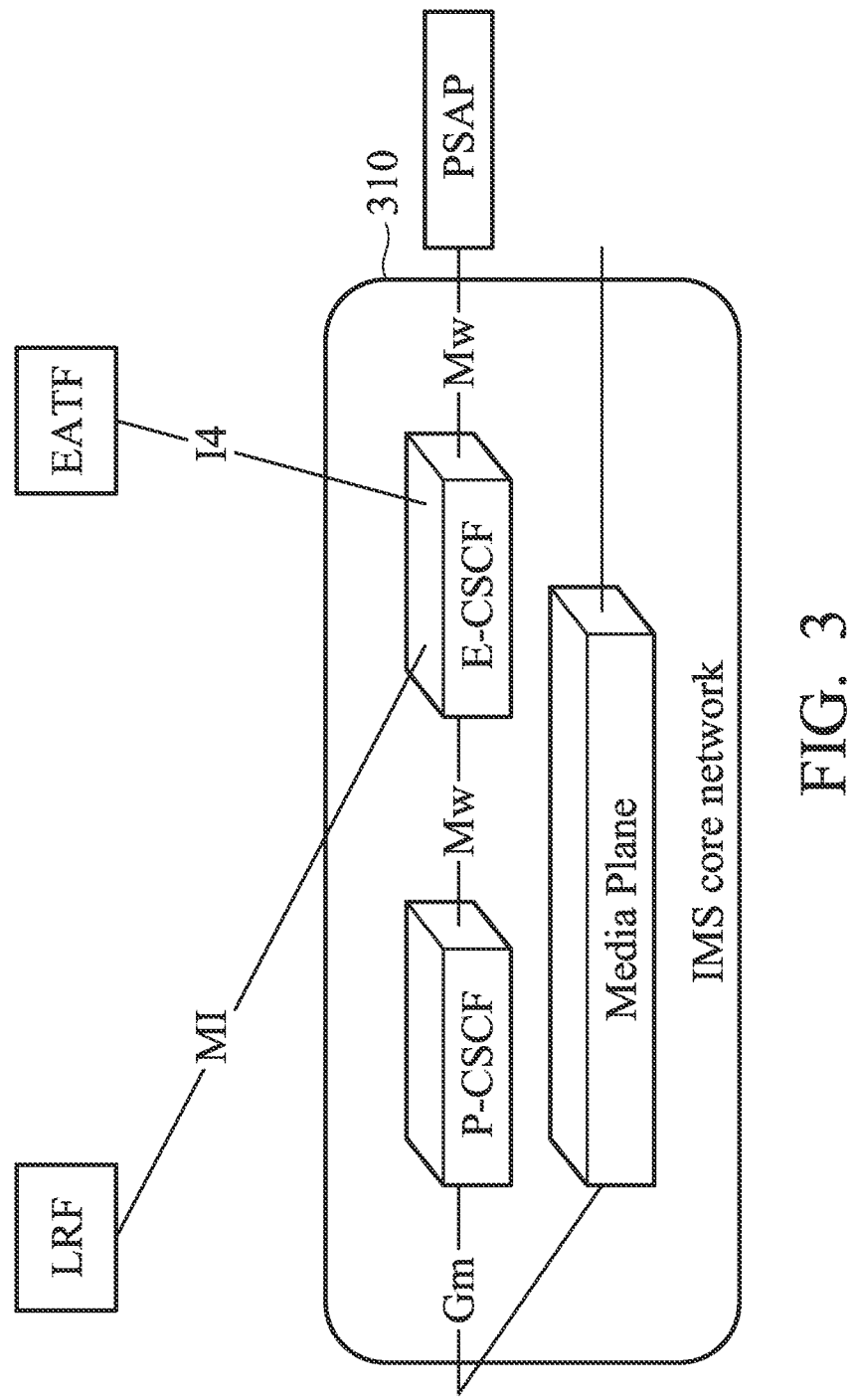
FIG. 3 shows a schematic architecture of an IMS for handling an emergency call according to an embodiment of the invention.

FIG. 3 shows a schematic architecture of an IP Multimedia Subsystem (IMS) for handling an emergency call according to an embodiment of the invention. The IMS core network 310 includes P-CSCF and Emergency CSCF (E-CSCF) network nodes and a media plane. The Public Safety Answering Point (PSAP) is a call center responsible for answering calls to an emergency telephone number for police, firefighting, and ambulance services. The Location Retrieval Function (LRF) facilitates the E-CSCF to determine the location of the calling UE. The Emergency Access Transfer Function (EATF) provides the procedures and functions for IMS emergency session anchoring and Packet Switched (PS) to Circuit Switched (CS) Access Transfer. The LRF may communicate with the E-CSCF via an MI interface. The EATF may communicate with the E-CSCF via an I4 interface.

Since the architectures for handling the normal call and the emergency call in the IMS are different, the normal call and the emergency call are routed in different ways as well. Generally, when the UE recognizes that the address of a received call-origination request is an emergency call address, the UE may establish an emergency Packet Data Network (PDN) (that is, an emergency bearer) or include an SOS tag in a Session Initiation Protocol (SIP) message, such that this call can be routed as an emergency call. An emergency call can has higher priority, lower blocking rate, and fewer control policies compared to a normal call. However, when the UE is unable to recognize that the address of a received call-origination request is an emergency call address (for example, when the user dials an emergency call number but the UE is unable to recognize it as an emergency call), the UE may establish a normal bearer and this emergency call may be routed as a normal call. Because the normal call has lower priority, higher blocking rate and more control policies than an emergency call, the appropriate emergency responders who are located in or near the user's current location may not receive notification in a timely manner. Therefore, the problems of long delays and/or a high call drop rate may occur with non-detected emergency calls. Therefore, it is important for the UE to learn the non-detected emergency call.

Figure 4:
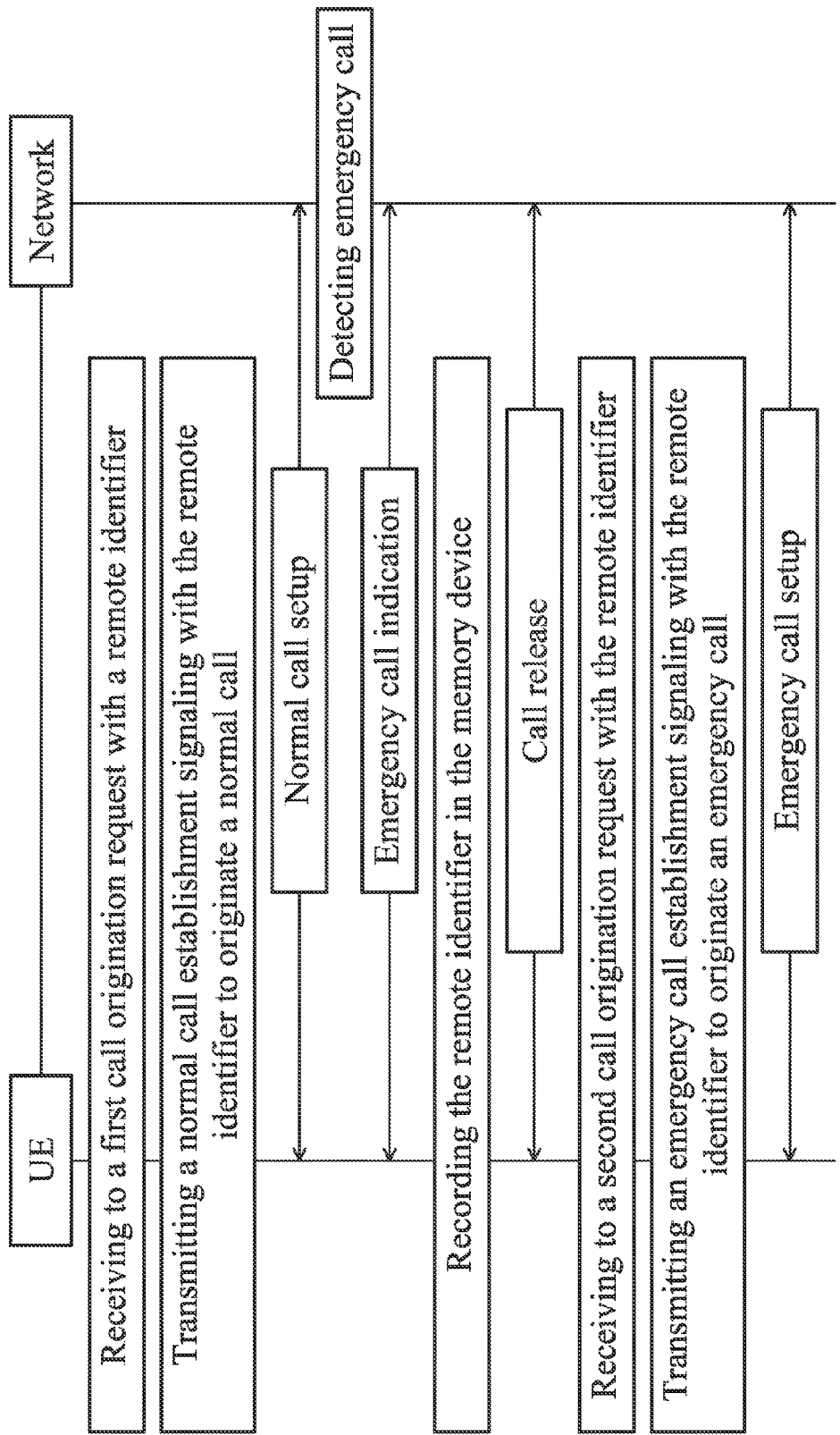
FIG. 4 shows a flow chart of processing an emergency call in a communications system according to an embodiment of the invention.

FIG. 4 shows a flow chart of processing an emergency call in a communications system according to an embodiment of the invention. According to an embodiment of the invention, when receiving a first call-origination request with a remote identifier (for example, the call-origination request may be received when the user has dialed a URI or phone number), the processor (e.g. the processor 130) of the communications apparatus (e.g. the communications apparatus 100, which may be the UE in a communications network) may first determine whether the remote identifier is an emergency call address. According to an embodiment of the invention, the remote identifier and the emergency call address may be a Mobile Station International Subscriber Directory Number (MSISDN), an SIP Uniform Resource Identifier (URI), or a telephone URI.

When the processor determines that the remote identifier is not an emergency call address, the processor may transmit a normal call-establishment signal with a remote identifier to the network to originate a normal call in response to the first call-origination request. Upon receiving the normal call-establishment signal, the network may begin a normal call setup procedure based on the architecture as shown in FIG. 2.

During the normal call setup procedure, the normal call-establishment signal may be routed from the P-CSCF to the S-CSCF, and then to the SIP-AS. The P-CSCF and/or the SIP-AS at the network side may detect again whether the remote identifier is an emergency call address. When the remote identifier is detected as an emergency call address at the network side, an emergency call indication may be transmitted from the network to the UE.

According to an embodiment of the invention, the indication message may be an SIP message in the IMS. For example, the indication message may be a 380 (alternative service) SIP response message indicating that the normal call is routed as an emergency call. In another example, the indication message may be an SIP response message containing a P-Asserted-Identity header field and an SOS tag indicating that the normal call is routed as an emergency call.

Upon receiving the indication message, the processor may learn that the remote identifier is for emergency calls, and may record the remote identifier in an emergency-call database in the memory device (e.g. the memory device 140). The emergency-call database may be presented in any form, and the invention should not be limited thereto. For example, the emergency-call database may be a list of numbers, IP addresses, SIP URIs or telephone URIs of the emergency calls. In another example, the emergency-call database may be a data structure recording the numbers, IP addresses, SIP URIs or telephone URIs of the emergency calls. According to an embodiment of the invention, the numbers, IP addresses, SIP URIs or telephone URIs of the emergency calls may be obtained from the data stored in the Universal Subscriber Identity Module (SIM) cards, from the data received from the network, from the data manually setup or entered by the user, and the data learned during the call establishment procedure as described above.

After the call is released and when the processor receives a second call-origination request with the remote identifier, again, the processor may detect that the remote identifier is an emergency call address by comparing the remote identifier with the data recorded in the emergency-call database. After that, the processor may transmit an emergency call-establishment signal with the remote identifier to the network to originate an emergency call in response to the second call-origination request. Upon receiving the emergency call-establishment signal, the network may begin an emergency call setup procedure based on the architecture as shown in FIG. 3. Therefore, for the second time when the processor receives a call-origination request with the same remote identifier, the call-origination request can be treated properly as an emergency call, and the problems of delays and/or dropped calls caused by non-detected emergency calls can be solved.

According to another embodiment of the invention, besides the remote identifier, the processor may further record the current location information of the communications apparatus (or the UE) with respect to the remote identifier that is to be recorded in the emergency call database by the processor.

Figure 5:
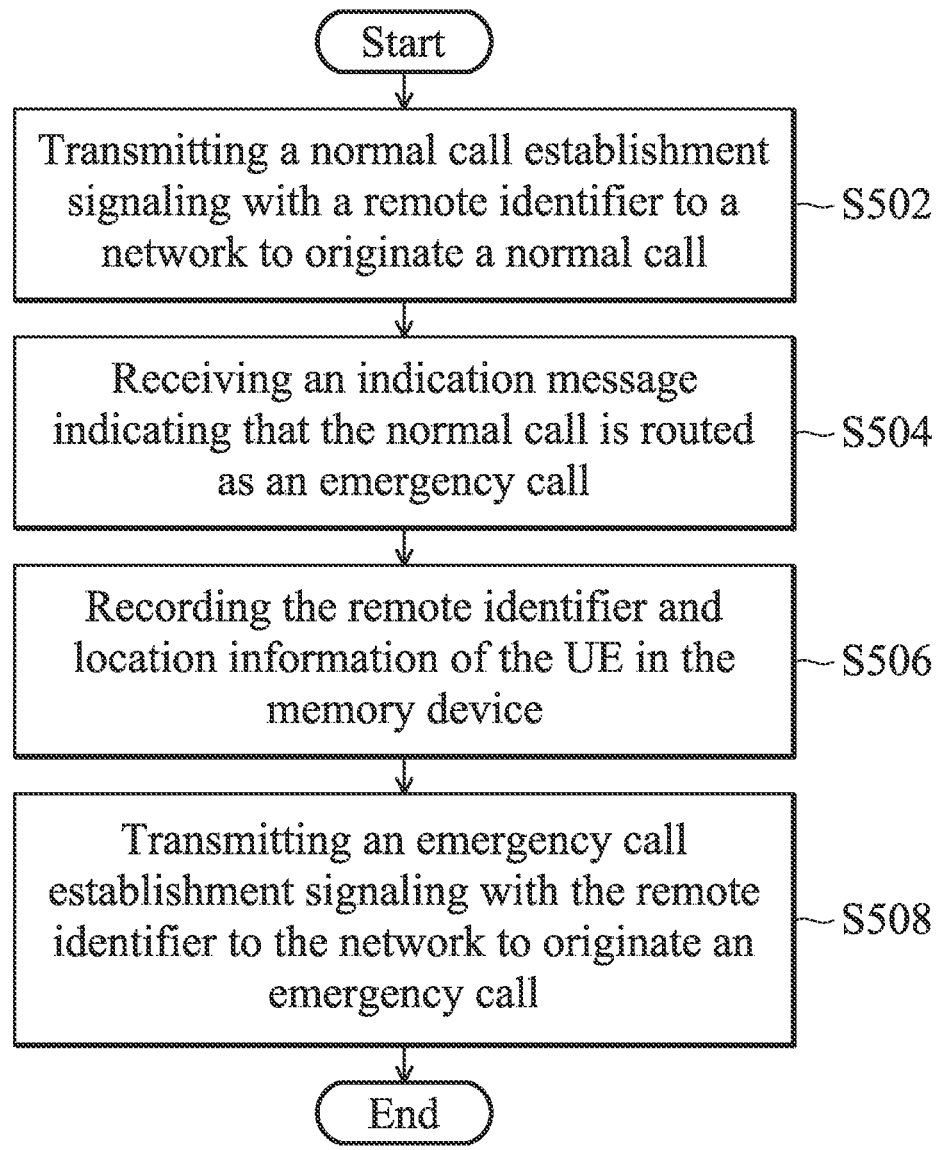
FIG. 5 shows a flow chart of processing an emergency call in a communications system according to another embodiment of the invention.

FIG. 5 shows a flow chart of processing an emergency call in a communications system according to another embodiment of the invention. In the flow chart shown in FIG. 5, the processes on the network side are omitted and only the processes executed by the communications apparatus (or the UE) are shown. For the descriptions of the processes on the network side, reference may be made to the descriptions in FIG. 4, which are omitted here for brevity.

First of all, the processor may transmit a normal call-establishment signal with a remote identifier to a network to originate a normal call in response to a call-origination request with the remote identifier (Step S502). When the remote identifier is a non-detected emergency call address, the processor may receive an indication message indicating that the normal call is routed as an emergency call from the network (Step S504) when the remote identifier is detected by the network as an emergency call address. Next, the processor may record the remote identifier and location information of the communications apparatus (or the UE) in the memory device of the communications apparatus (or the UE) (Step S506). According to an embodiment of the invention, the remote identifier accompanying the current location information of the communications apparatus may be recorded in the emergency call database as discussed above. The current location information of the communications apparatus may be important information utilized to further determine whether the recorded remote identifier is valid or not. According to an embodiment of the invention, the location information may be the Public Land Mobile Network Identity (PLMN ID) of the network, the Base Station Identifier (BSID) of the network, the cell ID of the network, the Mobile Country Code (MCC) of the network and/or the Global Positioning System (GPS) data of the communications apparatus (or the UE). Note that "network" here refers to the network that the communications apparatus (or the UE) accesses, camps on, registers to, and/or is associated with.

Finally, once the processor receives another call-origination request with the same remote identifier, the processor may recognize that the remote identifier is an emergency call address by inspecting the records in the emergency-call database as discussed above, and may transmit an emergency call-establishment signal with the remote identifier to the network to originate an emergency call in response to the call-origination request (Step S508). The inspecting of the emergency-call database may be performed by, for example, comparing the remote identifier with the records in the emergency-call database.

According to yet another embodiment of the invention, the processor may further determine whether the remote identifier recorded in the emergency-call database is still a valid emergency call address. For example, for different countries or different areas, the emergency call address may be different. When the processor determines that the remote identifier recorded in the emergency-call database is no longer a valid emergency call address, the processor may delete the record.

Figure 6:
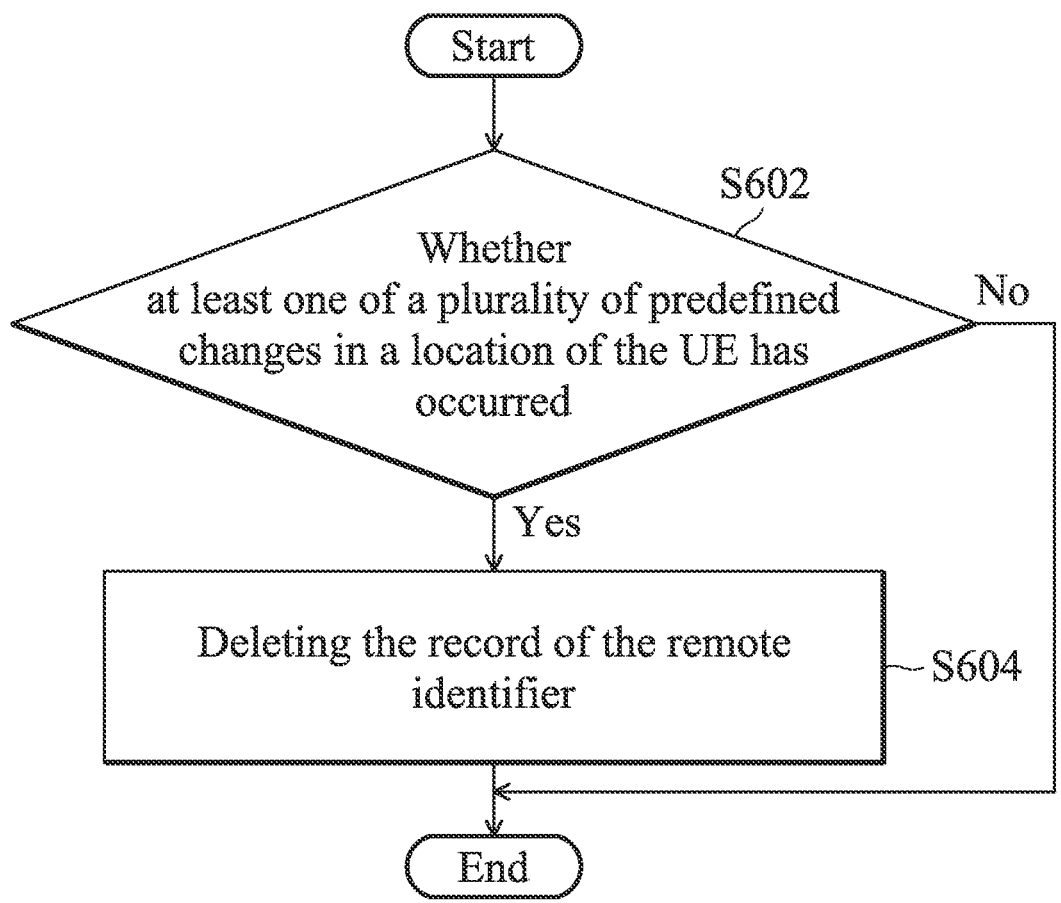
FIG. 6 shows a flow chart of managing the emergency call database according to yet another embodiment of the invention.

FIG. 6 is a flow chart for managing the emergency-call database according to yet another embodiment of the invention. To manage the emergency-call database, the processor may first determine whether at least one of a plurality of predefined changes in the location of the communications apparatus (or the UE) has occurred (Step S602). According to an embodiment of the invention, whether at least one of the predefined changes has occurred may be determined by comparing the recorded location information associated with the recorded remote identifier with the current location information of the communications apparatus (or the UE).

According to an embodiment of the invention, the predefined changes in the location may be a change in the PLMN ID of the network, a change in the BSID of the network, a change in the cell ID of the network, a change in the MCC of the network, a change in the registration status of the UE with respect to the network and a change in the GPS data of the UE. Note that "network" here refers to the network that the communications apparatus (or the UE) accesses, camps on, registers to, and/or is associated with. The registration status change of the UE with respect to the network may be determined by whether the communications apparatus (or the UE) has de-registered from the network which the communications apparatus (or the UE) has previously been registered with when recording the remote identifier, or whether the registration status of the communications apparatus (or the UE) with respect to the network, which the communications apparatus (or the UE) has previously registered with when recording the remote identifier, has been changed from registered to un-registered, or the like.

If none of the predefined changes in the location of the communications apparatus (or the UE) has occurred, the record of the remote identifier may be kept in the emergency call database since it may still be a valid emergency call address. If any of the predefined changes in the location of the communications apparatus (or the UE) has occurred, the processor may delete the record of the remote identifier (Step S604).

When the emergency-call database is well-maintained, not only can the problems of delays and/or dropped calls caused by non-detected emergency calls be solved, but also the situations of mistakenly transmitting an emergency call-establishment signal with a remote identifier which is not a valid emergency call address can be prevented.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
a baseband signal processing device;
a radio frequency (RF) signal processing device;
a memory device; and
a processor, for transmitting a normal call-establishment signal with a remote identifier to a network to originate a normal call in response to a first call-origination request with the remote identifier initiated from a user, receiving an indication message indicating that the normal call is routed as an emergency call from the network, establishing the normal call and recording the remote identifier in an emergency-call database in the memory device, after the normal call is released and when receiving a second call-origination request with the remote identifier, detecting that the remote identifier is an emergency call address by comparing the remote identifier with data recorded in the emergency-call database and transmitting an emergency call-establishment signal with the remote identifier to the network to originate an emergency call in response to the second call-origination request initiated from the user.

2. The communications apparatus as claimed in claim 1, wherein the remote identifier is a Mobile Station International Subscriber Directory Number (MSISDN), a Session Initiation Protocol (SIP) Uniform Resource Identifier (URI), or a telephone URI.

3. The communications apparatus as claimed in claim 1, wherein the indication message is an SIP message in an IP Multimedia Subsystem (IMS).

4. The communications apparatus as claimed in claim 1, wherein the indication message is an alternative service SIP response message.

5. The communications apparatus as claimed in claim 1, wherein the indication message is an SIP response message containing a P-Asserted-Identity header field and an SOS tag.

6. A method for processing an emergency call, comprising:
transmitting a normal call-establishment signal with a remote identifier to a network to originate a normal call in response to a first call-origination request with the remote identifier initiated from a user by a user equipment;
receiving an indication message indicating that the normal call is routed as an emergency call from the network by the user equipment;
establishing the normal call and recording the remote identifier in an emergency-call database in a memory device by the user equipment;
and
after the normal call is released and when receiving a second call-origination request with the remote identifier, detecting that the remote identifier is an emergency call address by comparing the remote identifier with data recorded in the emergency-call database and transmitting an emergency call-establishment signal with the remote identifier to the network to originate an emergency call in response to the second call-origination request initiated from the user by the user equipment.

7. The method as claimed in claim 6, wherein the user equipment further recording location information of the user equipment in the memory device and the location information of the user equipment comprises a Public Land Mobile Network Identifier (PLMN ID) of the network, a Base Station Identifier (BSID) of the network, a cell ID of the network, a Mobile Country Code (MCC) of the network and/or Global Positioning System (GPS) data of the user equipment.

8. The method as claimed in claim 6, wherein the remote identifier is a Mobile Station International Subscriber Directory Number (MSISDN), a Session Initiation Protocol (SIP) Uniform Resource Identifier (URI), or a telephone URI.

9. The method as claimed in claim 6, wherein the indication message is an SIP message in an IP Multimedia Subsystem (IMS).

10. The method as claimed in claim 6, wherein the indication message is an alternative service SIP response message.

11. The method as claimed in claim 6, wherein the indication message is an SIP response message containing a P-Asserted-Identity header field and an SOS tag.

12. A method for processing an emergency call, comprising:
    transmitting a normal call-establishment signal with a remote identifier to a network to originate a normal call in response to a first call-origination request with the remote identifier initiated from a user by a user equipment;
    receiving an indication message indicating that the normal call is routed as an emergency call from the network by the user equipment;
    establishing the normal call and recording the remote identifier and location information of the user equipment in an emergency-call database in a memory device by the user equipment;
    receiving a second call-origination request with the remote identifier after the normal call is released;
    transmitting an emergency call-establishment signal with the remote identifier to the network to originate an emergency call in response to the second call-origination request initiated from the user when detecting that the remote identifier is an emergency call address by comparing the remote identifier with data recorded in the emergency-call database by the user equipment;
    determining whether at least one of a plurality of predefined changes in a location of the user equipment has occurred; and
    deleting the record of the remote identifier by the user equipment when at least one of the predefined changes in the location of the user equipment is determined to have occurred.

13. The method as claimed in claim 12, wherein the location information of the user equipment comprises a Public Land Mobile Network Identifier (PLMN ID) of the network, a Base Station Identifier (BSID) of the network, a cell ID of the network, a Mobile Country Code (MCC) of the network and/or a Global Positioning System (GPS) data of the user equipment.

14. The method as claimed in claim 12, wherein the predefined changes in the location of the user equipment comprise a change in a PLMN ID of the network, a change in a BSID of the network, a change in a cell ID of the network, a change in a MCC of the network, a change in a registration status of the user equipment with respect to the network and a change in a GPS data of the user equipment.

15. The method as claimed in claim 14, wherein whether at least one of the predefined changes of the user equipment has occurred is determined by comparing the recorded location information associated with the recorded remote identifier with current location information of the user equipment.

16. The method as claimed in claim 12, wherein the remote identifier is a Mobile Station International Subscriber Directory Number (MSISDN), a Session Initiation Protocol (SIP) Uniform Resource Identifier (URI), or a telephone URI.

17. The method as claimed in claim 12, wherein the indication message is an SIP message in an IP Multimedia Subsystem (IMS).

18. The method as claimed in claim 12, wherein the indication message is an SIP response message containing a P-Asserted-Identity header field and an SOS tag.

* * * * *